W. M. NICHOLS AND R. L. HARDING.
STEEL TANK CONSTRUCTION.
APPLICATION FILED JULY 19, 1920.
1,402,949.
Patented Jan. 10, 1922.
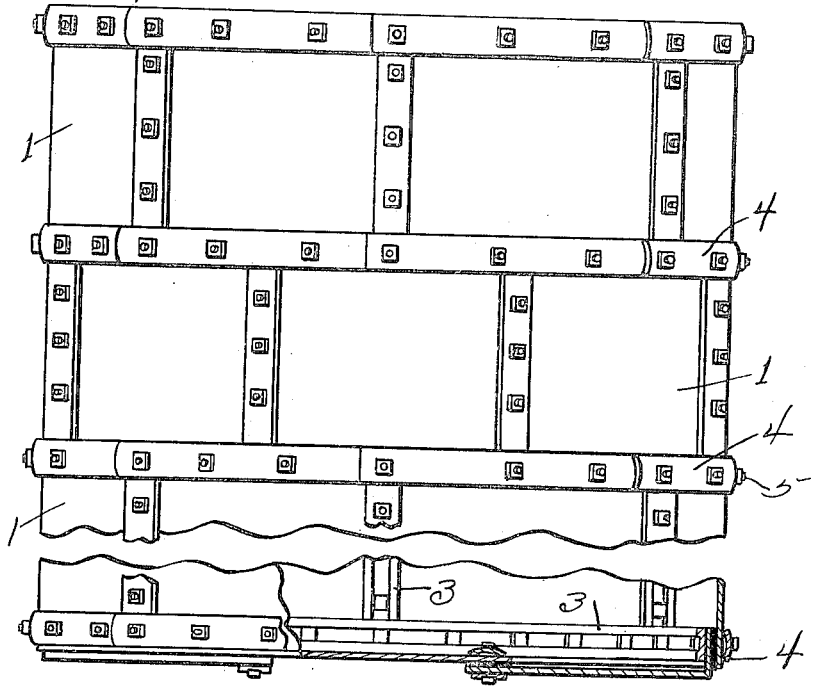
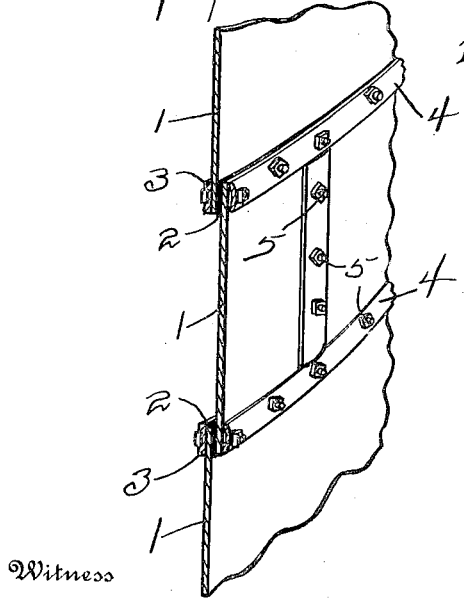
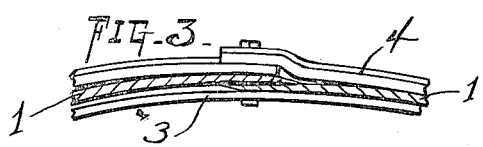
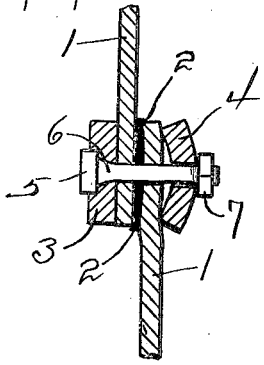
Inventor
Watt M. Nichols.
AND
Roy L. Harding.
Witness
John E. Melton,
By A. L. Jackson
Attorney

UNITED STATES PATENT OFFICE.

WATT M. NICHOLS AND ROY L. HARDING, OF RANGER, TEXAS.

STEEL TANK CONSTRUCTION.

1,402,949.  Specification of Letters Patent.  Patented Jan. 10, 1922.

Application filed July 19, 1920. Serial No. 397,393.

*To all whom it may concern:*

Be it known that we, WATT M. NICHOLS and ROY L. HARDING, both citizens of the United States of America, residing at Ranger, in the county of Eastland and State of Texas, have invented certain new and useful Improvements in Steel Tank Constructions, of which the following is a specification.

Our invention relates to tanks and more particularly to steel tanks; and the object is to construct a tank which will have great strength and which will be leak proof and which can be easily and quickly assembled. One of the advantages is that the joints are so sealed that such material as oil will not reach into the joint and another advantage is that the joints are so formed by the laps or folds that the tank is strengthened by the joints and in expansion the joints are tightened by reason of the construction of the metal bands and bolts. Other objects and advantages will be fully explained in the following description and the invention will be more particularly pointed out in the claims.

Reference is had to the accompanying drawings which form a part of this application.

Fig. 1 is a broken side elevation of a tank, partly in section, showing the improved construction. Fig. 2 is an enlarged section in perspective, showing the improved construction. Fig. 3 is a broken horizontal section of a vertical joint. Fig. 4 is an enlarged section of a vertical joint.

Similar characters of reference are used to indicate the same parts throughout the several views.

The tank is particularly useful for containing crude or other oils in oil fields and refineries. The vertical sections 1 are connected as shown in the several views. The edges of sections 1 are lapped with gaskets 2 between the lapped edges. Channel bands 3 are placed on the inside of a joint and bands 4 are placed on the outside of a joint. The band 4 is concave on the inside, as shown in the drawings, particularly in Fig. 4, for the purposes of clamping the metal of the sections 1 on the gasket 2. The effect of this clamping is to force the edges of the gasket towards the center of the gasket instead of outwardly. Bolts 5 have heads which fit in the channels of the bands 3 and pass through the channel bands. At the parts where the bolts pass through the channel bands, the bolts are enlarged at 6 and made tapering. When the nut 7 is tightened on the band by screwing the same on the bolt 5, the edges of the band 4 will bear on the lapping edge of the metal section 1 and force the metal on the gasket and pinch the gasket so that the gasket will be caught firmly between the metal sections of the tank and cannot be removed. The tapering form 6 of the bolt will wedge into the opening in the metal and seal the opening so that no oil can come from the inside and get into the gasket. The head of the bolt will fit flat in the bottom of the channel in the band 3 and thus aid in preventing the oil from reaching the gasket. The channel will prevent the bolt head from turning.

The edges of the metal are rolled and brought to a feather edge as shown in Fig. 3 so that the joints will not be enlarged. The lapping of the edges and bands are so arranged as to form braces so that in case of expansion, the joints will be strengthened rather than weakened.

The joints in the bottom of the tank are formed in the same manner, except that the channel bars are placed under the bottom sections. All joints are formed in a similar manner. It is apparent that various changes in the sizes, construction, and arrangement of the several parts may be made without departing from our invention.

What we claim, is,—

1. A steel tank construction comprising a lapping of the sections of the tank, gaskets interposed between the lapping edges, channel bands on the interior of the joints perforated in the bottoms of the channels for bolts, bands on the exterior of the joints and bolts having a part thereof tapering and passing through both bands and the lapping edges and gasket of each joint and braced against rotation by the walls of said channels, and nuts for clamping the band on the joint.

2. In a steel tank constructed of sheet metal sections having the edges thereof lapped, gaskets interposed between the lapping edges, channel bands on the interior of the lapping edges perforated for the passage of bolts, concave bands on the exterior of the lapping edges, bolts having heads fitted in said channels and braced against the walls of the channels and having parts thereof tapering from the heads to be wedged into the openings in said bands for sealing purposes, and nuts for drawing said bolts with their tapering forms into the openings in said channel bands and for clamping said concave bands on the lapping edges of the metal.

In testimony whereof, we set our hands, this 6th day of July, A. D. 1920.

WATT M. NICHOLS.
ROY L. HARDING.